US010660321B2

(12) United States Patent
Tseng

(10) Patent No.: US 10,660,321 B2
(45) Date of Patent: May 26, 2020

(54) FISHING LINE WINDER

(71) Applicant: Ching-Hua Tseng, Taichung (TW)

(72) Inventor: Ching-Hua Tseng, Taichung (TW)

(73) Assignee: Ching-Hua Tseng, Taichung (TW)

( * ) Notice: Subject to any disclaimer, the term of this patent is extended or adjusted under 35 U.S.C. 154(b) by 53 days.

(21) Appl. No.: 15/241,145

(22) Filed: Aug. 19, 2016

(65) Prior Publication Data

US 2017/0064933 A1 Mar. 9, 2017

(30) Foreign Application Priority Data

Sep. 7, 2015 (TW) .............................. 104214458 U

(51) Int. Cl.
| | |
|---|---|
| *A01K 89/00* | (2006.01) |
| *A01K 89/033* | (2006.01) |
| *A01K 89/017* | (2006.01) |
| *B65H 54/10* | (2006.01) |
| *B65H 54/72* | (2006.01) |
| *B65H 54/44* | (2006.01) |
| *B65H 59/04* | (2006.01) |
| *B65H 54/12* | (2006.01) |
| *B65H 54/547* | (2006.01) |

(52) U.S. Cl.
CPC .......... *A01K 89/003* (2013.01); *A01K 89/017* (2013.01); *A01K 89/045* (2015.05); *A01K 89/058* (2015.05); *B65H 54/106* (2013.01); *B65H 54/12* (2013.01); *B65H 54/44* (2013.01); *B65H 54/547* (2013.01); *B65H 54/72* (2013.01); *B65H 59/04* (2013.01); *B65H 2701/355* (2013.01)

(58) Field of Classification Search
CPC .. A01K 89/003; A01K 89/045; A01K 89/017; A01K 89/058; B65H 54/547; B65H 54/44; B65H 54/12; B65H 59/04; B65H 54/106; B65H 54/72; B65H 2701/355
See application file for complete search history.

(56) References Cited

U.S. PATENT DOCUMENTS 3,704,840 A * 12/1972 Haddock .............. A01K 89/003
242/470
4,007,886 A * 2/1977 Kaminstein .......... A01K 89/003
242/470

(Continued)

FOREIGN PATENT DOCUMENTS

| JP | 2005-3288208 | * | 6/2015 |
| JP | 3198395 U | * | 7/2015 |

OTHER PUBLICATIONS

English Machine Translation of JP 2005-328828, Hasegawa, (Dec. 2005).*

*Primary Examiner* — William A. Rivera

(57) ABSTRACT

A fishing line winder is disclosed. The line winder is combined with a line reel, so that a fishing line is sequentially reeled and unreeled. The line winder is a machine for preventing reverse winding and tangling, where a base of the fishing line winder is provided with a shaft, and a driving member drives the shaft to rotate, while a spindle is provided with a line spool, an abutment wheel and an unidirectional bearing; a resistance against the rotation of the abutment wheel is formed by means of a brake pad, thus preventing reverse winding and tangling when the fishing line is reeled onto and unreeled from the line reel.

5 Claims, 4 Drawing Sheets

(56) References Cited

U.S. PATENT DOCUMENTS

| | | | | |
|---|---|---|---|---|
| 4,588,139 A | * | 5/1986 | Lines | A01K 89/003 |
| | | | | 242/470 |
| 5,056,732 A | * | 10/1991 | Nicholson, Jr. | A01K 89/00 |
| | | | | 242/129.5 |
| 5,725,172 A | * | 3/1998 | Koehler | A01K 89/00 |
| | | | | 242/395 |
| 6,260,785 B1 | * | 7/2001 | Prais | A01K 89/003 |
| | | | | 242/390.8 |

* cited by examiner

FISHING LINE WINDER

CROSS-REFERENCE TO RELATED APPLICATIONS

The present application claims the benefit of Taiwanese Patent Application No. 104214458 filed on Sep. 7, 2015, the entire contents of which are hereby incorporated by reference.

BACKGROUND OF THE INVENTION

1. Field of the Invention

The present invention relates to a fishing line winder, and the line winder is combined with a line reel, so that a fishing line is sequentially reeled and unreeled.

2. Description of the Related Art

Nowadays, many people regard fishing as a leisure activity. When people go fishing, they need to pay attention to the location or habits of fish, and in addition, equipment carried by people is also an important factor for fishing. Common line reels are usually classified into two types for people to select: manual line reels and electric line reels.

In terms of an electric line reel, when it needs to be maintained, scrubbed or cleaned, people usually need to draw out a fishing line that is originally winded on the line reel. The fishing line that has been drawn out needs to be winded on a line spool temporarily, and the fishing line on the line spool is then winded back onto the electric reel after the maintenance of the electric reel is finished.

On the other hand, the current method cannot regularly wind the fishing line back onto the electric reel, and the fishing line is retracted before being straightened, which easily causes problems of unsmooth rolling, an incorrect line extension distance, and jammed line extension. Therefore, a conventional manner easily causes inconvenience in use.

SUMMARY OF THE INVENTION

Accordingly, the present invention provides a fishing line winder, which has a more convenient operation manner and a better effect.

An implementation manner of the present invention provides a fishing line winder that mainly coordinates with a line reel, so that a fishing line thereof is capable of being smoothly reeled onto and unreeled from the line reel. The fishing line winder includes: a base, where an upper end of the base is further provided with a support in a protruding manner; a shaft, where the shaft is pivotally arranged at one end of the support and remains horizontal; a driving member, where the driving member is connected to the shaft when a user wants to reel the line onto the line reel, and drives the shaft to rotate, so that the fishing line in a line spool thereof is sequentially reeled and unreeled regularly; a line spool, having an axis portion and retaining portions located on two sides of the axis portion, where the axis portion is coaxially and fixedly connected to the shaft in a pivotal manner and can allow the fishing line to be bound therein; a first abutment wheel, which is coaxially arranged on the shaft and has a pressing portion and an abutting portion, where the pressing portion is connected to an edge of an axle hole on a lateral end of the line spool, so that the line spool is in tight joint during pivoting; a second abutment wheel, which is coaxially arranged on the shaft and has a pressing portion and an abutting portion, where the pressing portion is connected to an edge of an axle hole on a lateral end of the line spool, so that the line spool is in tight joint during pivoting, and the second abutment wheel is located, opposite the first abutment wheel, on the other lateral edge of the line spool; two brake pads, where one brake pad is arranged, opposite the line spool, on the other side of the first abutment wheel, and the other brake pad is arranged, opposite the line spool, on the other side of the second abutment wheel; a second brake seat, arranged on the shaft and away from the driving member; an adjustment member, where the adjustment member is arranged on the shaft and located on an end side of the second brake seat; and a buffer member, where the buffer member is arranged on the shaft and is close to the driving member.

The aforementioned and other objectives and advantages of the present invention can be easily understood in depth from the following detailed description and accompanying drawings of the selected embodiments.

Certainly, the present invention allows differences in some alternative elements or arrangement of the alternative elements, but the selected embodiments are described in detail in the specification, and structures of the selected embodiments are demonstrated in the accompanying drawings.

REFERENCE NUMBERS

Figure 1:
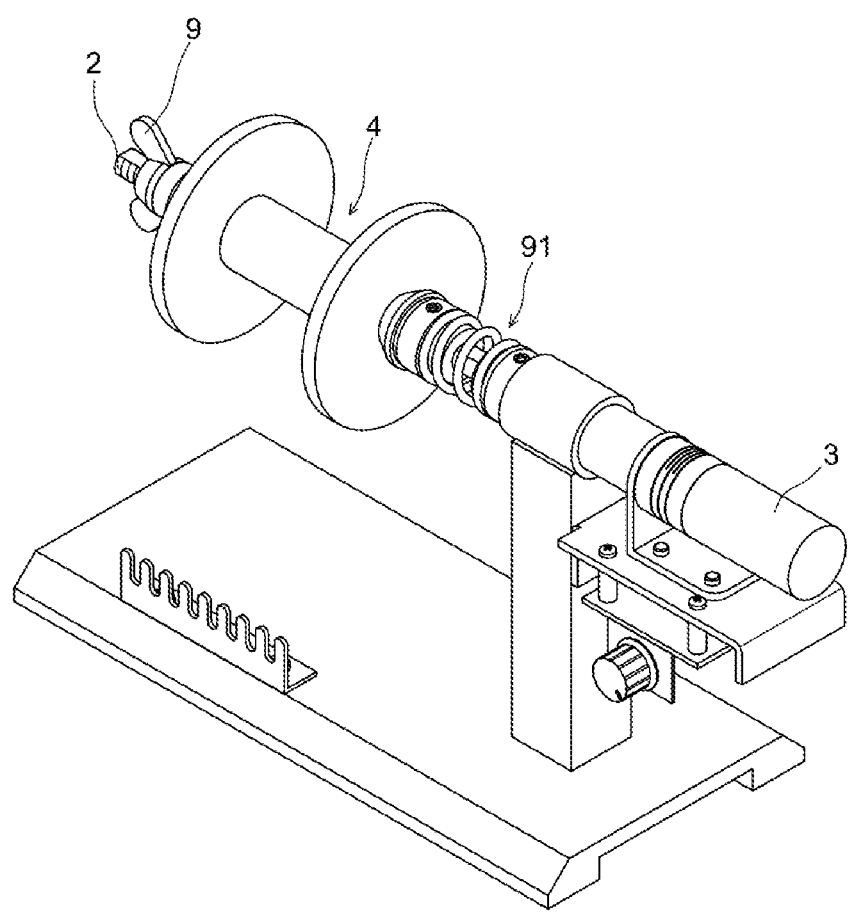
FIG. 1 is a three-dimensional view of a fishing line winder according to an implementation manner of the present invention.

| | |
|---|---|
| Base 1 | Retaining portion 42 |
| Support 11 | First abutment wheel 5 |
| Control box 12 | Pressing portion 51 |
| Shaft 2 | Abutting portion 52 |
| Flat section 21 | Second abutment wheel 6 |
| Threaded section 22 | Pressing portion 61 |
| Unidirectional bearing 23 | Abutting portion 62 |
| Driving member 3 | Brake pad 7 |
| Line spool 4 | Second brake seat 8 |
| Axis portion 41 | Adjustment member 9 |
| Line reel R | Buffer member 91 |
| First brake seat 911 | |

DETAILED DESCRIPTION OF THE PREFERRED EMBODIMENTS

Figure 2:
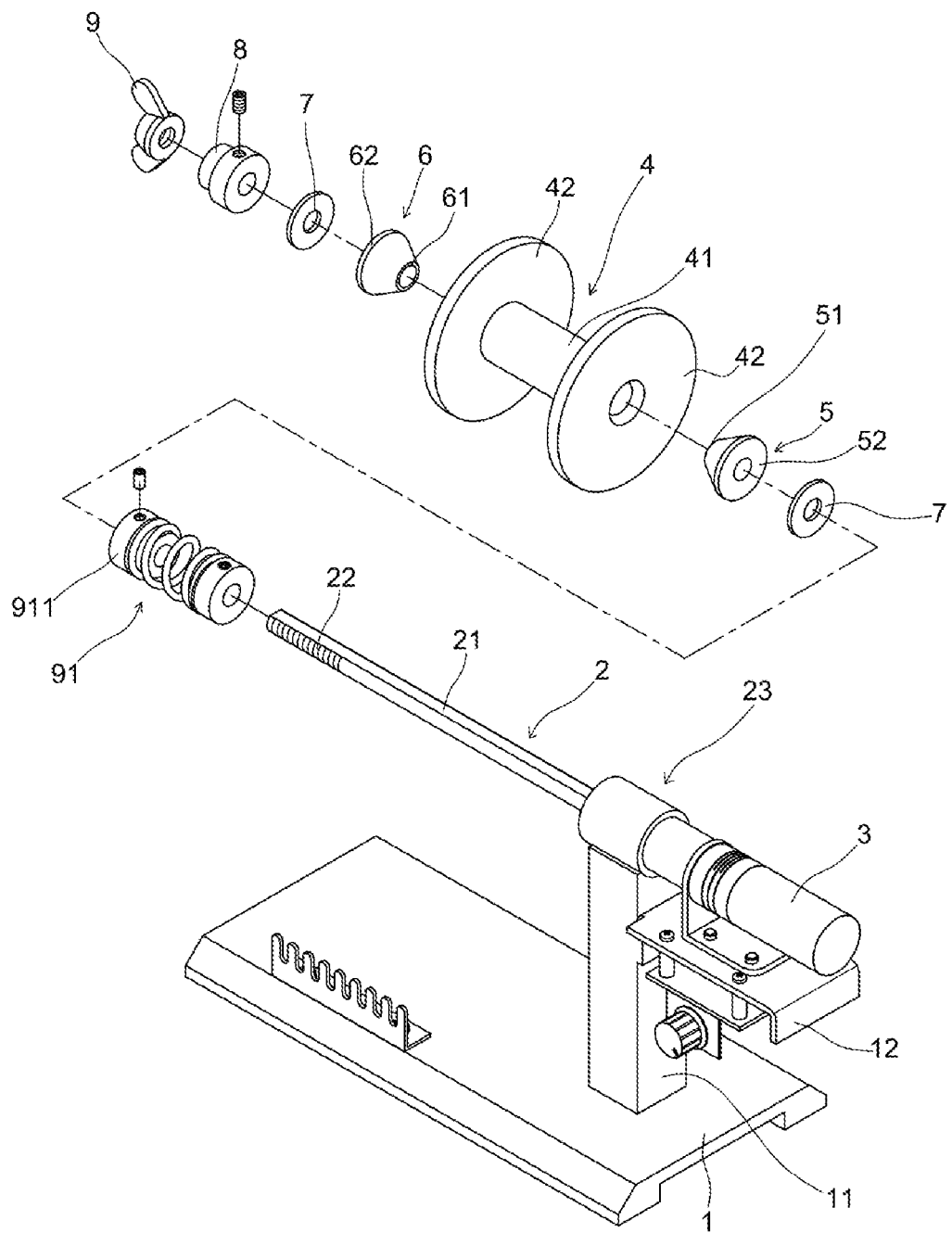
FIG. 2 is an exploded view of a fishing line winder according to an implementation manner of the present invention.
Figure 3:
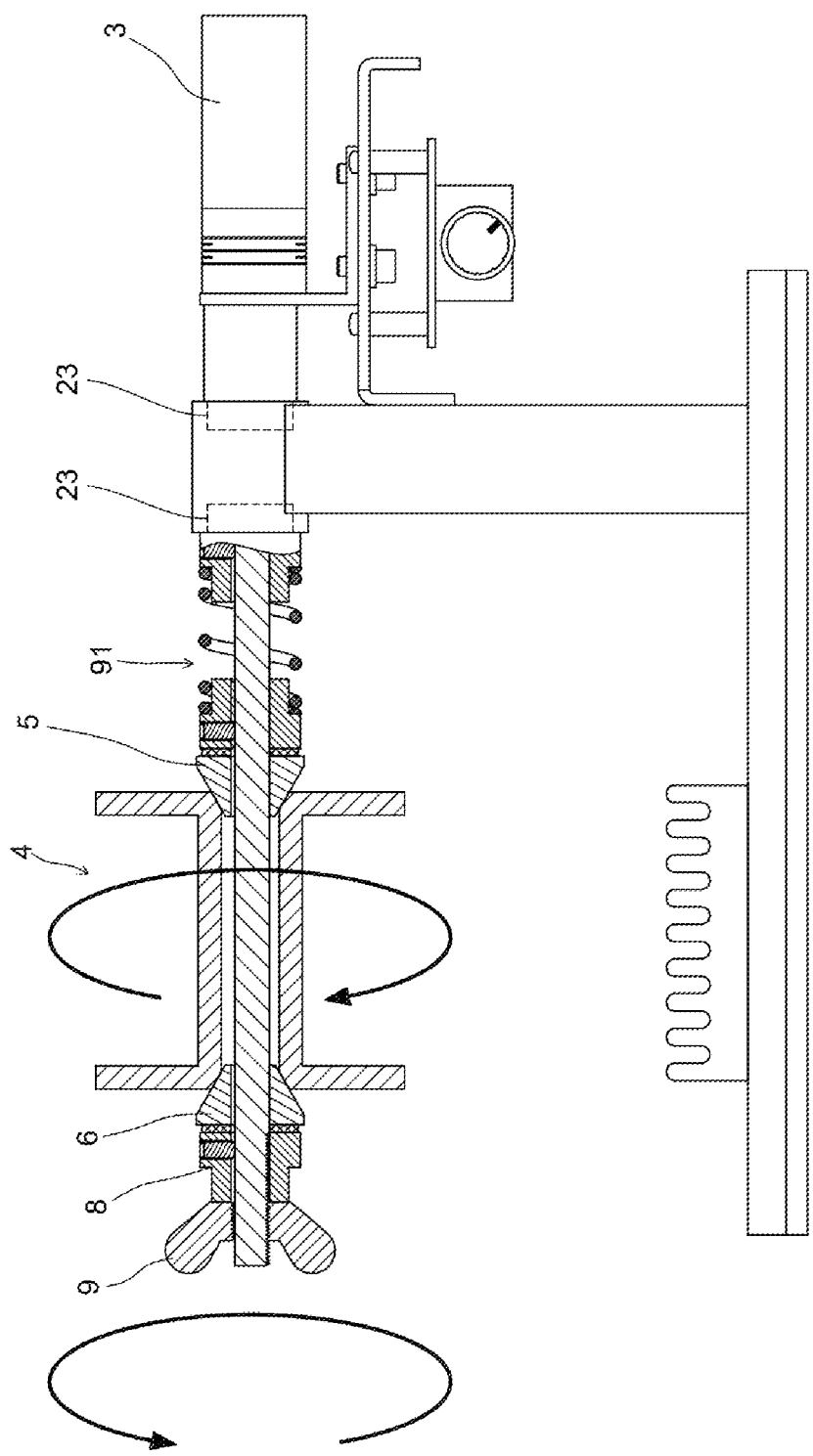
FIG. 3 is a sectional view of a fishing line winder according to an implementation manner of the present invention.
Figure 4:
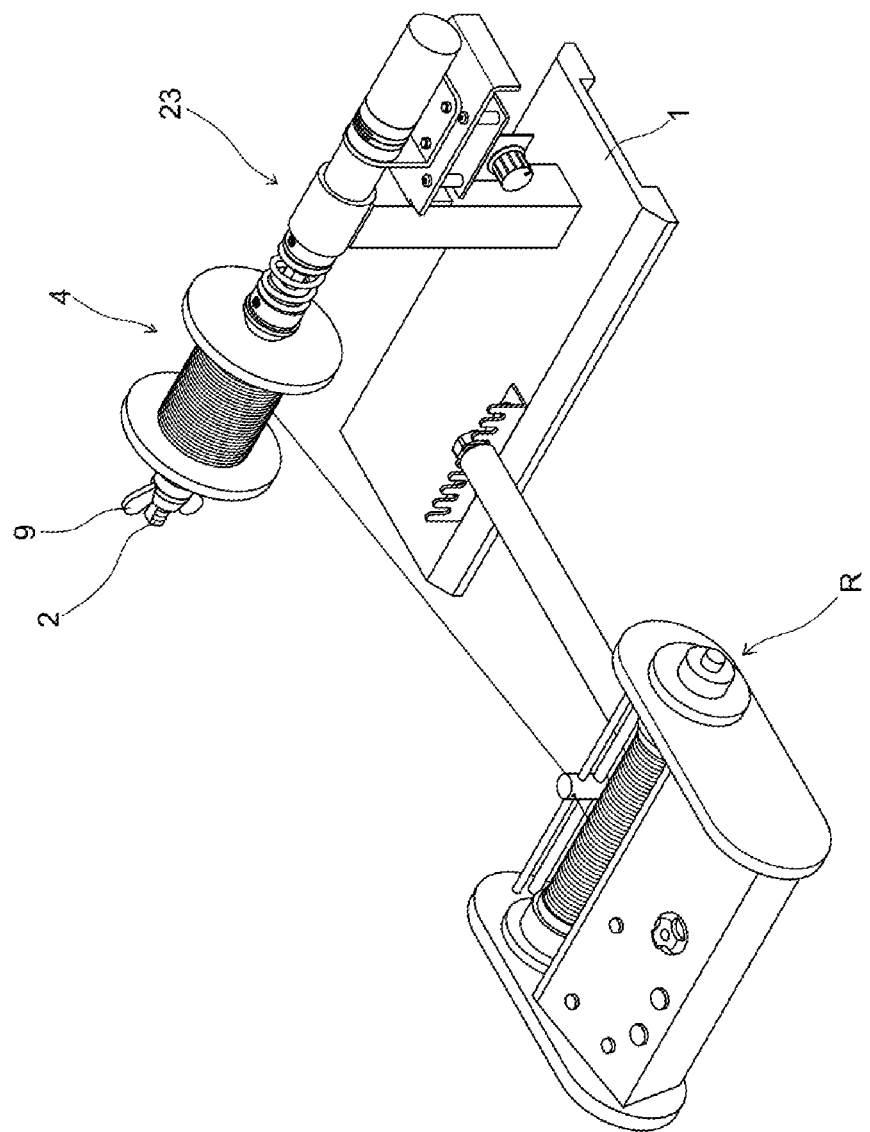
FIG. 4 is a three-dimensional view of a fishing line winder according to another implementation manner of the present invention.

Refer to FIG. 1 to FIG. 4. FIG. 1 to FIG. 4 show structures of selected embodiments of the present invention, and are merely used for the illustrative purpose. The patent application is not limited to such structures.

The present embodiment provides a fishing line winder that mainly coordinates with a line reel R, so that a fishing line thereof can be smoothly reeled onto and unreeled from the line reel. The fishing line winder includes: a base 1, where an upper end of the base 1 is further provided with a support 11 in a protruding manner; a shaft 2, where the shaft 2 is pivotally arranged at one end of the support 11 and remains horizontal; a driving member 3, where the driving member is connected to the shaft 2 when a user wants to reel the line onto the line reel, and drives the shaft 2 to rotate, so that the fishing line in a line spool 4 thereof is sequentially and regularly reeled; a line spool 4, having an axis portion 41 and retaining portions 42 located on two sides of the axis portion 41, where the axis portion 41 is coaxially and fixedly connected to the shaft 2 in a pivotal manner and can allow the fishing line to be bound therein; a first abutment wheel 5, which is coaxially arranged on the shaft 2 and has a pressing portion 51 and an abutting portion 52, where the pressing portion 51 is connected to an edge of an axle hole on a lateral end of the line spool 4, so that the line spool 4 runs in a more tightly joint manner during pivoting; a second abutment wheel 6, which is coaxially arranged on the shaft 2 and has a pressing portion 61 and an abutting portion 62, where the pressing portion 61 is connected to an edge of an axle hole on a lateral end of the line spool 4, so that the line spool runs in a more tightly joint manner during pivoting, and the second abutment wheel 6 is located, opposite the first abutment wheel 5, on the other lateral edge of the line spool 4; two brake pads 7, where one brake pad is arranged, opposite the line spool 4, on the other side of the first abutment wheel 5, and the other brake pad is arranged, opposite the line spool 4, on the other side of the second abutment wheel 6; a second brake seat 8, arranged on the shaft 2 and away from the driving member 3, where an inner edge of the second brake seat is provided with a protruding point so that the second brake seat can move on the surface of the shaft, which allows the user to adjust a resistance value more conveniently, and the second brake seat can further clamp the brake pad 7 together with the second abutment wheel 6 to achieve a braking effect; an adjustment member 9, where the adjustment member 9 is arranged on the shaft and located on an end side of the second brake seat 8, and by screwing the adjustment member 9 tightly on the shaft 2, an effect of fastening the above components such as the line spool 4, the two brake pads 7, the first abutment wheel 5, the second abutment wheel 6, the second brake seat 8, and the buffer member 91 can be achieved, so that reeling by high speed rotation is completed faster and more efficiently, and the adjustment member 9 is screwed tight when unreeling is desired; and a buffer member 91, where the buffer member 91 is arranged on the shaft 2 and close to the driving member 3.

In conclusion, when the line is reeled onto the line reel, the shaft is not actuated owing to the unidirectional bearing, while the first abutment wheel 5, the second abutment wheel 6, the brake pads 7, and the line spool 4 slide simultaneously, and the brake seats 8 and 911 therefore produce damping, to achieve the reeling tightness.

In the present embodiment, the shaft 2 further includes a flat section 21 and a threaded section 22, where the flat section is arranged at an end, which is close to the driving member 3, of the shaft 2, and the threaded section 22 is arranged at the other end that is away from the driving member 3 relative to the flat section 21. The flat section 21 and the threaded section 22 are further provided with respective horizontal planes that are in communication. By means of the aforementioned design, displacement can be smoother, and the line can be reeled onto and unreeled from the line spool 4 more easily.

Furthermore, the other side of the support 11, which is opposite the shaft 2, is further provided with a control box 12, where an internal accommodating room in the control box 12 can be used to accommodate a control apparatus and relatively precise components such as a PCB, so that the control apparatus and the precise components are not damaged due to many factors such as water spray or moisture or an external force, and by setting the control box 12, the overall appearance and visual effect of the present invention can be further improved.

Besides, the driving member 3 described above is a motor capable of driving the shaft 2 to rotate, that is, the motor is used as a power source, and the power source drives the shaft to be actuated synchronously, thus achieving an unreeling effect of an electric line reel.

In the present embodiment, a unidirectional bearing 23 is arranged between the shaft 2 and the coaxially arranged driving member 3, so that during reeling, the unidirectional bearing 23 prevents the shaft 2 from being actuated, while enables the first brake seat 911 and the second brake seat 8 to produce damping, and enables the brake pad 7, the first abutment wheel 5 and the second abutment wheel 6 to produce damping, where values of the damping can be adjusted by tightening or loosening the adjustment member 9, so as to achieve expected reeling tightness.

When the fishing line winder in the present embodiment retracts the drawn-out fishing line, the fishing line maybe connected to a suitable position of the line spool 4. In this way, the shaft 2 may be driven to rotate by driving for the line reel R, thereby driving the line spool 4 to rotate fast, so that the fishing line of the original line reel R can be drawn out and winded between the two retaining portions 42 on the line spool 4. After the fishing line is completely drawn out of the line reel R, repair and maintenance operations can be performed on the line reel R. The actuation described above is unreeling, and apart from the actuation described above, during unreeling, the line reel R uses the line spool 4, the first brake seat 911, the second brake seat, two brake pads, the first abutment wheel, and the second abutment wheel, to produce damping for clamping the line spool, and the shaft drives the line spool to achieve an unreeling effect.

After the repair and maintenance operations on the line reel R are finished, the fishing line originally on the line spool 4 may be winded back onto the line reel R, and in this case, the fishing line may be connected to the line reel R, and after the adjustment member 9 is screwed tight, and the line reel R is operated to wind the fishing line back onto the line reel R.

The embodiment described above is used to illustrate the present invention rather than limiting the present invention. Therefore, any change in values or equivalent component replacement shall still fall in the scope of the present invention.

According to the detailed description above, a person skilled in the art can understand that the present invention can indeed achieve the aforementioned objective. The specification of the patent law is met effectively, and the patent application is thus filed.

What is claimed is:

1. A fishing line winder, the fishing line winder mainly coordinating with a line reel, so that a fishing line thereof is capable of being smoothly reeled onto and unreeled from the line reel, the fishing line winder comprising:
   a base, wherein an upper end of the base is further provided with a support in a protruding manner;
   a shaft, wherein the shaft is pivotally arranged on one end of the support and remains horizontal;
   a driving member, wherein the driving member is connected to the shaft and drives the shaft to rotate;

a line spool, having an axis portion and retaining portions on two sides of the axis portion, wherein the axis portion is coaxially and fixedly connected to the shaft;

a first abutment wheel, which is coaxially arranged on the shaft, has a pressing portion and an abutting portion, and is located on a lateral edge of one retaining portion of the line spool;

a second abutment wheel, which is coaxially arranged on the shaft, has a pressing portion and an abutting portion, and is located, opposite the first abutment wheel, on the other lateral edge of the line spool;

two brake pads, wherein one brake pad is arranged, opposite the line spool, on the other side of the first abutment wheel; the other brake pad is arranged, opposite the line spool, on the other side of the second abutment wheel; and the two brake pads form respective resistances against the rotation of the first abutment wheel and the second abutment wheel;

a second brake seat, which is arranged on the shaft and located away from the driving member;

an adjustment member, wherein the adjustment member is arranged on the shaft and located on an end side of the second brake seat; and a buffer member, wherein the buffer member is arranged on the shaft and close to the driving member, and is further provided with a first brake seat at the end away from the driving member.

2. The fishing line winder according to claim 1, wherein the shaft further comprises a flat section and a threaded section.

3. The fishing line winder according to claim 1, wherein one side of the support is provided with a control box.

4. The fishing line winder according to claim 1, wherein the driving member is a motor capable of automatically driving the shaft to rotate.

5. The fishing line winder according to claim 1, wherein a unidirectional bearing is arranged on the shaft, and the unidirectional bearing allows the shaft to perform relative rotation in a unilateral direction.

* * * * *